A. ANDREOLLI.
HOSE COUPLING.
APPLICATION FILED MAY 26, 1916.
1,209,374.  Patented Dec. 19, 1916.
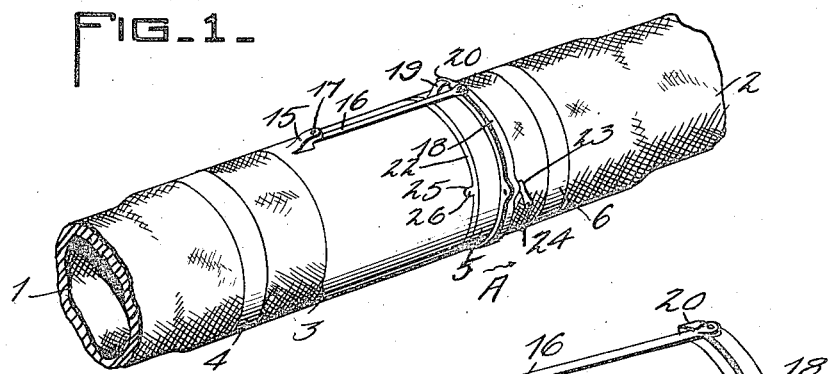
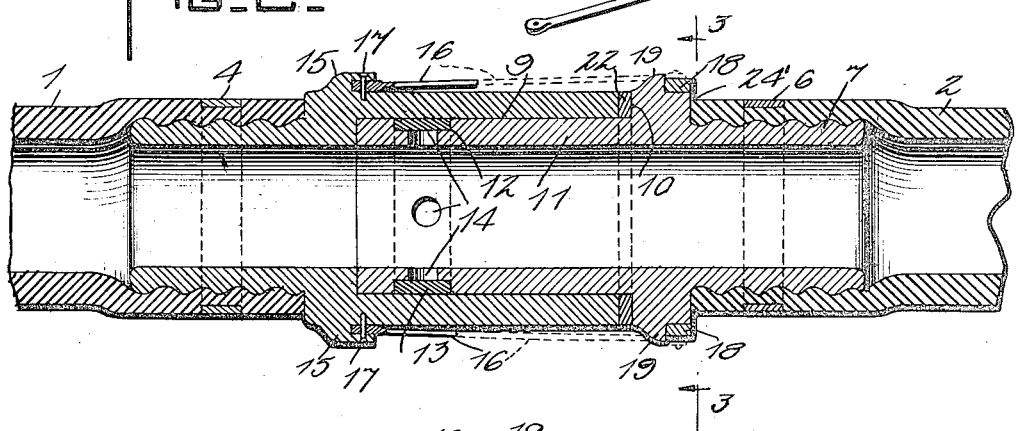
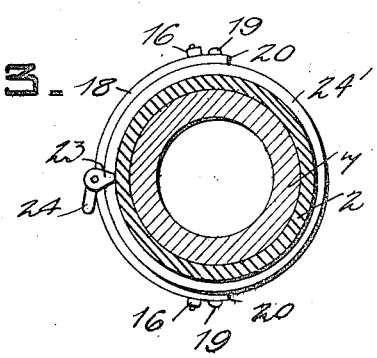
WITNESSES
INVENTOR
ANGELO ANDREOLLI,
BY
ATTORNEYS

UNITED STATES PATENT OFFICE.

ANGELO ANDREOLLI, OF MEADOW LANDS, PENNSYLVANIA.

HOSE-COUPLING.

1,209,374.                Specification of Letters Patent.      Patented Dec. 19, 1916.

Application filed May 26, 1916. Serial No. 99,955.

*To all whom it may concern:*

Be it known that I, ANGELO ANDREOLLI, a citizen of the United States, and a resident of Meadow Lands, in the county of Washington and State of Pennsylvania, have invented new and useful Improvements in Hose-Couplings, of which the following is a specification.

My invention is an improvement in hose couplings, and has for its object to provide a coupling of the character specified, wherein the coupling members are connected together without the use of screw threads or the like, and wherein the pressure of the water passing through the coupling assists in maintaining the connection water tight, and wherein the members are easily connected and disconnected.

In the drawings, Figure 1 is a perspective view of the improved coupling, Fig. 2 is a longitudinal section of the same, Fig. 3 is a section on the line 3—3 of Fig. 2, looking in the direction of the arrows adjacent to the line, and Fig. 4 is a perspective view of the yoke.

In the present embodiment of the invention the hose sections 1 and 2 which are to be connected, are fitted over the reduced ends 3 and 7 of the sections of a rigid coupling, the said ends being roughened or corrugated externally to prevent slipping of the hose sections.

The hose section 1 is secured to the reduced end 3 of the coupling section 5, by means of a band 4 which encircles the hose section and clamps it to the reduced end of the coupling section. The section 2 is secured to the reduced portion 7 of the other coupling section 11, by means of a similar band 6, and the coupling section 5 is internally enlarged as indicated at 9 to receive the section 11.

An annular shoulder 8 is formed at the inner end of the enlarged portion, and the end of the section 11 abuts against the shoulder. An external shoulder 10 is formed on the section 11 at the end of the other coupling section, and a gasket 22 is arranged between this shoulder and the end of the section.

The coupling section 11 is provided with an external annular groove or recess 12 near its inner end, and a gasket or packing ring 13 is seated in this recess. A series of openings 14 is provided in the bottom of this recess 12, the said openings permitting the pressure of the liquid in the hose section to be communicated to the gasket or packing ring, for pressing the ring outward into close contact with the interior of the section 5.

Lugs 15 are provided on opposite sides of the section 5, and arms 16 are pivoted to the lugs by means of pins or screws 17. A yoke 18 is connected to the arms at the ends remote from the pins 17, and this yoke is adapted to embrace the coupling section 11. The said section 11 has lugs 19, which are adapted to be engaged by the ends of the yoke which extend outwardly beyond the arms, to prevent longitudinal movement of the sections away from each other.

When the yoke is moved in the direction of the arrow indicated at A in Fig. 1, the coupling sections 5 and 11 will be forced together, thus placing the gasket or washer 22 under compression. The yoke 18 is provided with a cam member or lever 23 pivoted to the yoke, and having a handle 24, and when the yoke has been moved in the direction of the arrow A to the point where the cam member 23 will engage behind the shoulder 24', between the body of the coupling 11 and the reduced portion 7, the sections 3 and 5 of the coupling will be held in locked relation. The cam member 23 when locked prevents the outward movement of the yoke 18 away from the section 2. This cam member locks behind the shoulder 24' which is formed between the body of the section and the reduced portion 7 over which the hose section slips.

As shown in Fig. 1, the reduced portion of the section 5 is provided with a recess 25, and the section 11 of the coupling is provided with a lug 26 which is adapted to engage the recess to insure that the sections retain their proper relative annular position with respect to each other.

In use, when the coupling sections are connected, the pressure of the water passing through the couplings, forces the flexible gasket 13 outward into close engagement with the inner wall of the enlargement 9 of the section 5, thus preventing escape of water through the contracting surface of the coupling section.

To uncouple the sections of the hose, it is only necessary to swing the cam 23 until the nose thereof disengages from behind the shoulder 24' to permit the yoke 18 to swing outwardly, to disengage the ends thereof from the lugs 19, whereupon the coupling sections may be drawn apart to release the coupling.

I claim:

A pipe coupling comprising a pair of coupling sections, said sections being reduced at their outer ends to receive hose, one section being reamed at its inner end and the other reduced to fit within the reamed portion of the first-named section, packing between the sections, oppositely arranged link pivoted to the first-named section, a yoke pivoted to the ends of the links and shaped to fit and adapted to engage around the other section, said section having lugs for engagement by the yoke, and a cam lever pivoted to the yoke and adapted to engage behind the shoulder formed between the body of the section and the reduced portion.

ANGELO ANDREOLLI.